United States Patent [19]
Rösch

[11] Patent Number: 4,811,654
[45] Date of Patent: Mar. 14, 1989

[54] INTERNAL COMBUSTION ENGINE PISTON WITH LATERALLY OFFSET CRUDGEON-PIN BORE IN PISTON HEAD AND BODY PORTIONS

[75] Inventor: Fritz Rösch, Schwabach, Fed. Rep. of Germany

[73] Assignee: Alcan Aluminiumwerk Nürnberg GmbH, Nuremberg, Fed. Rep. of Germany

[21] Appl. No.: 928,413

[22] Filed: Nov. 7, 1986

[30] Foreign Application Priority Data

Nov. 12, 1985 [DE] Fed. Rep. of Germany ....... 3540085

[51] Int. Cl.⁴ ............................ F02F 3/00; F02F 3/16; F16J 1/16
[52] U.S. Cl. ........................................ 92/216; 92/190; 403/150; 403/155
[58] Field of Search ................. 92/187, 189, 190, 216, 92/218, 219, 238, 255, 259, DIG. 1; 403/150–52, 155, 265, 282, 345; 123/193 P

[56] References Cited

U.S. PATENT DOCUMENTS

| | | | |
|---|---|---|---|
| 1,430,010 | 9/1922 | Hartog | 92/238 X |
| 2,221,966 | 11/1940 | Elder | 92/190 X |
| 3,476,021 | 11/1969 | Williams | 403/152 X |
| 3,526,420 | 9/1970 | Brancaleone | 403/282 |
| 3,699,636 | 10/1972 | Walker | 403/282 X |
| 3,915,141 | 10/1975 | Ottl et al. | 92/255 X |
| 4,011,797 | 3/1977 | Cornet | 123/193 P X |
| 4,214,358 | 7/1980 | Clerc | 403/282 X |
| 4,356,800 | 11/1982 | Moebus | 123/193 P |

FOREIGN PATENT DOCUMENTS

| | | |
|---|---|---|
| 571548 | 10/1931 | Fed. Rep. of Germany . |
| 1949581 | 4/1971 | Fed. Rep. of Germany ........ 92/255 |
| 2253961 | 9/1973 | Fed. Rep. of Germany . |
| 2717692 | 10/1978 | Fed. Rep. of Germany . |
| 2717084 | 10/1978 | Fed. Rep. of Germany . |
| 3042461 | 5/1982 | Fed. Rep. of Germany ... 123/193 P |
| 3338419 | 5/1985 | Fed. Rep. of Germany . |
| 734363 | 8/1932 | France .................. 92/190 |
| 884969 | 9/1943 | France . |
| 43043 | 12/1971 | Japan ................ 123/193 P |
| 55-29063 | 3/1980 | Japan . |
| 83282 | 6/1954 | Norway .................. 403/265 |
| 539568 | 9/1941 | United Kingdom ............ 123/193 P |
| 1306082 | 2/1973 | United Kingdom ............ 123/193 P |

Primary Examiner—Robert E. Garrett
Assistant Examiner—George Kapsalas
Attorney, Agent, or Firm—Cooper & Dunham

[57] ABSTRACT

Piston for combustion engines consisting of an upper part forming the piston crown and a lower part forming the piston body. These two piston parts abut via annular contact surfaces in the piston axial direction and are coupled together via a gudgeon pin or a gudgeon pin bushing. In order to arrange such an unscrewed piston in such manner that its upper part need not be constructed to be rigid and heavy as in an articulated piston with pendulum shaft and that the construction of cooling channels between the upper and lower parts is possible without excessive expenditure and the constructional height of the piston can be small, the contact surfaces are mutually prestressed in the direction of the piston axis in that the gudgeon pin bore in the one piston part is arranged to be offset relative to the gudgeon pin bore in the other piston part in the unstressed condition in the direction of the piston axis. In this connection, the offset can amount to 0.5 to 10 parts per thousand of the piston diameter. By this offset according to the invention a substantially rigid inter-engaged and frictionally inter-locking coupling between the two piston parts is ensured.

12 Claims, 2 Drawing Sheets

INTERNAL COMBUSTION ENGINE PISTON WITH LATERALLY OFFSET CRUDGEON-PIN BORE IN PISTON HEAD AND BODY PORTIONS

BACKGROUND OF THE INVENTION

1. Field of the Invention

The invention relates to pistons for combustion engines consisting of an upper part forming the piston crown and a lower part forming the piston body, the upper part and lower part abutting each other in the direction of the piston axis via annular contact surfaces and being connectable together by means of a coupling element such as a gudgeon pin or a gudgeon pin bushing.

2. Description of the Prior Art

Such multi-part pistons are known. In such pistons, the upper and lower parts, which can be manufactured from differing materials or from the same material, must be connected together by coupling elements, such as, for example screws, or in the known so-called articulated pistons with pendulum shaft by the gudgeon pin which engages through both piston components.

The known multi-part screwed pistons consists in most cases of two differing materials, the material of the upper part consisting for example of steel or cast iron owing to its high thermal and mechanical loading, whilst the lower part, which has basically a guidance function, can consist of weight-saving light metal. Screwed multi-part pistons have the disadvantage that as a result of the screwed connection their weight is increased and assembly is made more difficult so that it is impossible to manufacture such pistons economically. Moreover, screwed connections are often problematical when subjected to cyclic thermal and mechanical loading.

In the known articulated pistons, in which both the upper part of the lower part can consist of the same or of differing materials, the ignition force is transferred from the upper part via the pin directly to the connecting rod whilst the lateral guidance forces are absorbed by the "pendulating" lower part, i.e. the lower part which is not supported in the axial direction on the periphery of the piston upper part (e.g. DE-PS No. 571 548, DE-AS No. 22 53 961, DE-OS No. 27 17 692 and DE-OS No. 33 38 419 as well as DE-PS No. 2 717 084).

The disadvantage of the known articulated piston lies in the fact that the upper part, which is not supported by the lower part in the vicinity of the outer diameter, is strongly deformed by the large ignition forces exerted particularly on the periphery of the piston end surface. In order to resist these loadings, the upper part must be rigid, i.e. provided with thick walls or with ribs, which causes an increase in weight. Moreover, the provision of cooling channels, is not possible without considerable expense owing to the peripheral gap between the upper and lower parts (see in particular DE-OS No. 33 38 419).

SUMMARY OF THE INVENTION

An object of the invention is to provide a piston in which the upper and lower parts are connected together by means of a coupling element such as a gudgeon pin or a gudgeon pin bushing such that its upper part need not be so rigid and heavy as in an articulated piston.

Another object of the invention is to provide a piston in which the provision of cooling channels is possible between piston upper and lower parts without excessive expenditure.

A further object of the invention is to provide a multi-part piston of relatively small constructional height.

According to the invention, there is provided a piston for combustion engines comprising: an upper part having a first gudgeon pin bore and forming a piston crown and a lower part having a second gudgeon pin bore and forming a piston body, the upper part and lower part mutually abutting in the axial direction of the piston via annular contact surfaces and being arranged for coupling together by a coupling element insertable into said pin bores, the first gudgeon pin bore being arranged in the uncoupled condition to the offset along the piston axis relative to the second gudgeon pin bore whereby the contact surfaces are mutually pre-stressed in the direction of the piston axis when coupled together by said coupling element.

With this construction of the piston, mutual pre-stressing of the upper and lower parts of the piston is achieved in the direction of the piston axis, which leads to an inter-engaged and frictionally interlocked substantially rigid connection between the upper and lower piston parts, whereby deformation of the upper part as a result of the high ignition pressure is minimized so that the upper part can be made lighter and simpler. Moreover, in this way short constructional height of the piston as a whole is possible since the upper part need only carry the compression ring, whilst all further piston rings can also be arranged in the lower part. Furthermore, as a result of the pre-stressing of the two piston parts, sealing in the coupling surfaces is achieved, whereby trouble-free arrangement of abritrarily configured cooling channels is possible between the upper and lower parts. In this connection, these cooling channels can have annular form but may also have another form or may extend only over a sector of a circle through the piston crown, e.g. if the piston is constructed with a strongly eccentric combustion chamber cavity.

The mutual offset according to the invention of the gudgeon pin bores in the upper and lower parts expediently amounts to 0.5 to 10 parts per thousand of the piston diameter. The degree of offset is dependent upon the materials used for the upper and lower parts of the piston and the expected operational temperatures of the piston parts. The abutting annular contact surfaces of the upper and lower piston parts can be flat or stepped. They can extend perpendicularly or substantially perpendicularly to the piston axis or may be inclined thereto.

It can furthermore be expedient to arrange a layer of mastic or adhesive between the abutting surfaces of the upper and lower parts. This mastic or adhesive layer can be arranged before pre-stressing of the piston parts, whereby it is possible to transport the piston with its two parts as a unit, before these parts are tensioned by the gudgeon pin during final installation. Moreover, the sealing of a cooling channel provided between the upper and lower piston parts can be improved by such a mastic or adhesive layer.

BRIEF DESCRIPTION OF THE DRAWINGS

In the drawings, exemplary embodiments of the invention are illustrated which are particularly expedient or advantageous and will be described in more detail in the following. In the drawings.

DETAILED DESCRIPTION OF THE PREFERRED EMBODIMENTS

Figure 1:
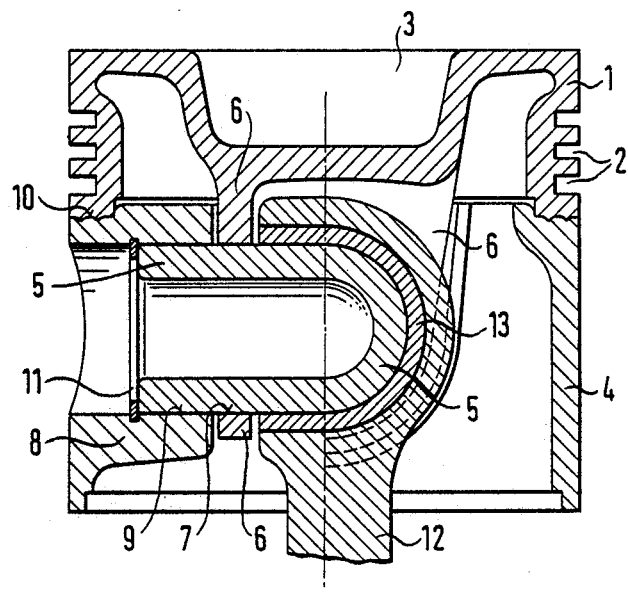
FIGS. 1 to 3 show three differing exemplary embodiments, each in two mutually perpendicular axial sections.

In the first exemplary embdiment illustrated in FIG. 1, the upper part 1 of the piston has all the annular grooves 2 for the reception of the piston rings. Furthermore, the upper part has a combustion cavity 3 concentric with the piston axis. The lower piston part 4 forming the piston body is connected to this upper part 1 via the gudgeon pin 5.

For mounting the gudgeon pin 5 in the upper part, this part is provided with two webs 6 in which the gudgeon pin bore 7 is located. The lower part 4 has in contrast a part 8 for the pin mounting which is radially recessed in its wall, and in which the gudgeon pin bore 9 is located. The pin bore 7 in the upper part 1 is arranged relative to the pin bore 9 in the lower part 4 in such manner that before insertion of the gudgeon pin 5 it is offset towards the piston head in the direction of the piston axis by 0.5 to 10 parts per thousand of the piston diameter when the upper and lower parts 1, 4 are lying in unstressed abutment at their annular contact surfaces 10. Thus, in FIG. 1 before the insertion of the pin 5 into the pin bores, the bore 9 lies deeper than the bore 7 by the above mentioned amount. Upon insertion of the gudgeon pin 5 into the pin bores 7 and 9, the lower part 4 is tensioned relative to the upper part 1 and in connection therewith in the contact surfaces 10 of the two piston parts are mutually tensioned in the direction of the piston axis, which leads to an inter-engaged and frictionally interlocked substantially rigid connection between the two piston parts.

The gudgeon pin 5 inserted into the pin bores is secured by spring rings 11 on its two ends in its position in the bores 7 and 9. The connecting rod 12 is mounted on the gudgeon pin 5 by means of its little end 13 located on the pin 5.

Figure 2:
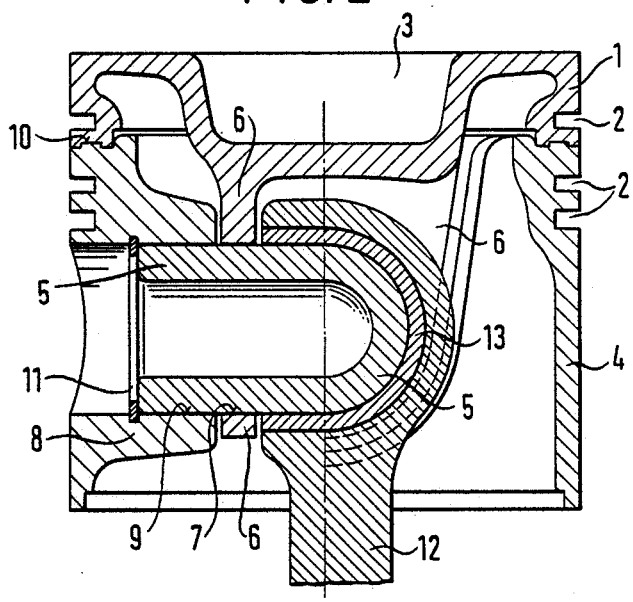

The exemplary embodiment according to FIG. 2 is distinguished from that of FIG. 1 substantially only in that the contact surfaces 10 between the upper part 1 and lower part 4 are profiled slightly differently and in that the upper part is constructed shorter in the axial direction and the lower part longer in this direction. In this way, only on annular groove is arranged in the upper part 1, whilst the two remaining annular grooves 2 are located in the lower part.

Moreover, also in this exemplary embodiment the mutual pre-stressing between the upper and lower parts of the piston is provided in the same manner as in the exemplary embodiment according to FIG. 1.

Figure 3:
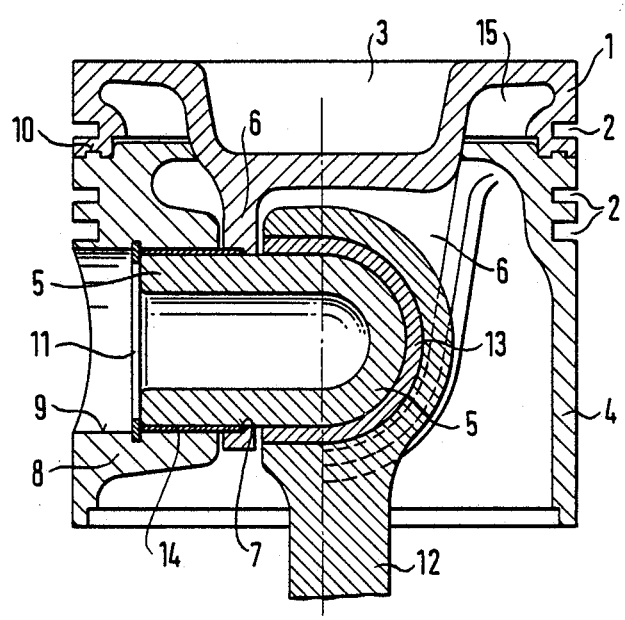

The exemplary embodiment according to FIG. 3 is distinguished from that according to FIG. 2 in that the upper part 1 and lower part 4 are mutually tensioned by bushings 14 driven into the gudgeon pin bores 7 and 9 from both piston sides. Also in this exemplary embodiment, the pin bore 9 is thus slightly offset relative to the pin bore 7 before insertion of the bushings 14 in the direction of the piston axis in order upon insertion of the bushings 14 to lead to pre-stressing of the two piston parts 1 and 4 in the region of their contact surfaces 10. This construction has the advantage that free movement of the pin 5 itself mounted in the bushing 14 is not hindered by the pre-stressing forces.

Moreover, the upper part and lower part in this embodiment are so constructed that upon assembly a substantially sealed cooling channel 15 is formed therebetween which is provided at positions which are not illustrated with an inlet and an outlet for cooling oil flow.

The contact surfaces 10 of the upper and lower parts 1 and 4 are constructed in the three illustrated embodiments to be profiled or stepped, the contact surfaces of the upper part extending parallel to the contact surfaces of the lower part. It is however also possible that the contact surfaces 10 of the two piston parts 1 and 4 do not extend exactly parallel to one another. This can for example be advantageous if the pre-stressing of the two piston parts is to be selected smaller, for example in zones of large deformation or high thermal loading of the piston part, than in the remaining zones, or vice versa.

It is also possible to construct the mutually oppositely lying contact surfaces of the piston parts 1 and 4 to be planar.

Figure 4:
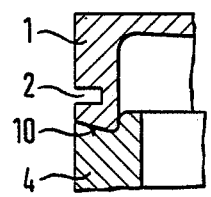
FIG. 4 shows a detail of a modification of the exemplary embodiment according to FIG. 2 or 3.

In FIG. 4, a variation of the contact surfaces 10 between the piston upper part 1 and lower part 4 is illustrated, which likewise can be expedient. In this embodiment, the contact surfaces extend in their radial outer region at such an inclination to the piston axis that under the influence of the ignition pressure the top land of the piston head is pressed at an angle to the piston axis and thus bending deformation of the upper part 1 caused by the ignition pressure is counteracted.

What is claimed is:

1. Piston for combustion engines comprising: an upper part having a first gudgeon pin bore and forming a piston crown and a lower part having a second gudgeon pin bore and forming a piston body, the upper part and lower part directly abutting each other in the axial direction of the piston via annular contact surfaces and being arranged for coupling together by a coupling element insertable into said pin bores, the first gudgeon pin bore being arranged in the uncoupled condition to be offset along the piston axis relative to the second gudgeon pin bore when the upper and lower parts are directly abutting each other as aforesaid whereby the contact surfaces are mutually prestressed in the direction of the piston axis when coupled together by said coupling element.

2. Piston according to claim 1 wherein the first gudgeon pin bore is offset relative to the second by between 0.5 and 10 parts per thousand of the piston diameter.

3. Piston according to claim 1 wherein the contact surfaces of the upper and lower parts of the piston are mutually parallel and perpendicular or substantially perpendicular to the piston axis.

4. Piston according to claim 1 wherein the contact surfaces of the upper and lower parts of the piston are mutually parallel and inclined to the piston axis.

5. Piston according to claim 1 wherein at least one of the two mutually oppositely lying contact surfaces of the piston upper part and piston lower part is stepped or profiled in the direction of the piston axis.

6. Piston according to claim 1 wherein at least one of the two contact surfaces is planar in axial section through the piston.

7. Piston according to claim 1 wherein between the contact surfaces of the piston upper part and piston lower part a layer of mastic or adhesive is arranged.

8. Piston according to claim 1 wherein the mutually oppositely lying contact surfaces of the piston upper part and piston lower part extend at least in zones of their periphery in the piston cross-section only approximately parallel to one another, i.e. at a slight angle to one another.

9. Piston according to claim 1 wherein the piston upper part and the piston lower part are so constructed that they enclose a hollow chamber usable as a cooling channel and sealed by the pre-stressing of upper and lower parts.

10. Piston according to claim 1 wherein said coupling element is a gudgeon pin.

11. Piston according to claim 1 wherein said coupling element is a bushing for a gudgeon pin.

12. Piston for combustion engines comprising an upper part forming the piston crown and a lower part forming the piston body, the upper part and lower part abutting each other via annular contact surfaces in the axial direction of the piston and being coupled together by a gudgeon pin or a gudgeon pin bushing, wherein the contact surfaces are mutually pre-stressed in the direction of the piston axis in that the gudgeon pin bore in the one piston is arranged in the unstressed condition to be offset, relative to the gudgeon pin bore in the other piston part, towards the piston head along the piston axis.

* * * * *